S. A. COGSDILL.
METHOD OF FORMING CUTTING TOOLS.
APPLICATION FILED FEB. 20, 1919.
1,379,853.
Patented May 31, 1921.
2 SHEETS—SHEET 1.
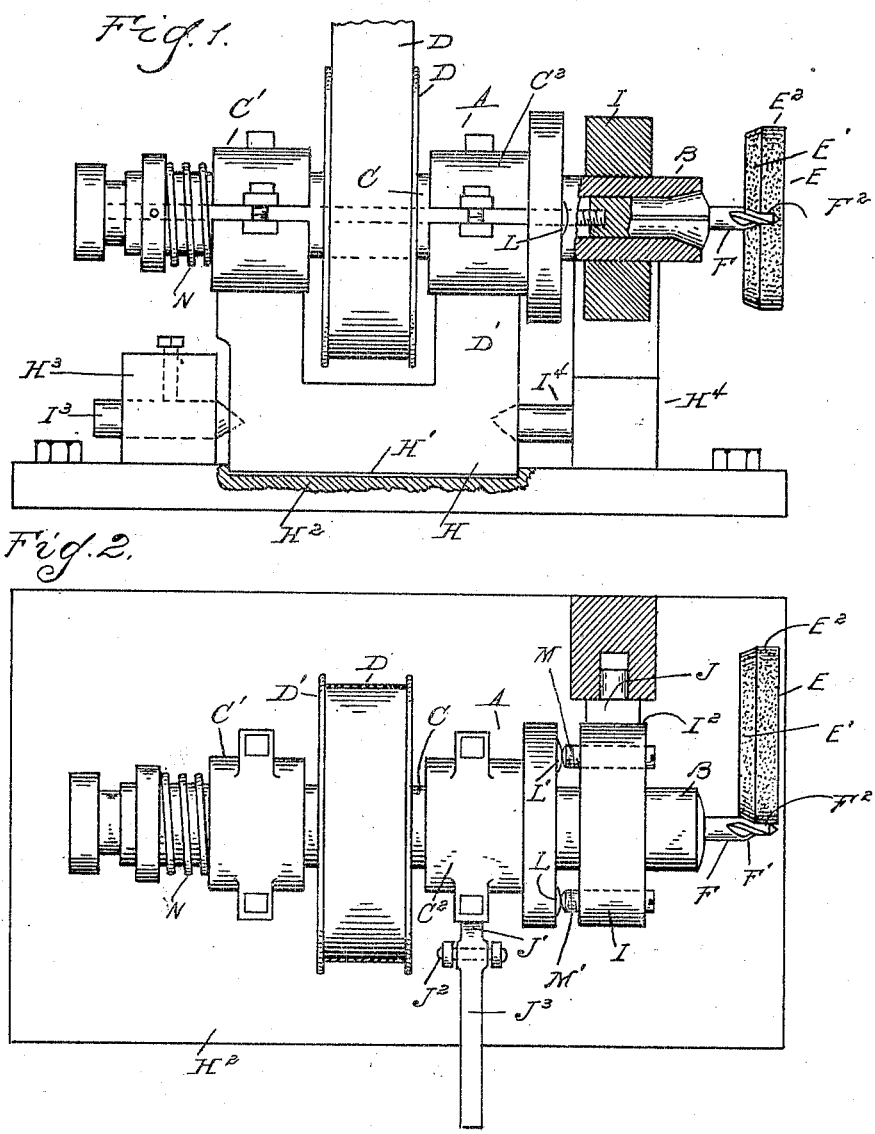
Inventor
Stuart A. Cogsdill
By Whittemore, Hulbert and Whittemore
Attorneys S. A. COGSDILL.
METHOD OF FORMING CUTTING TOOLS.
APPLICATION FILED FEB. 20, 1919.

1,379,853.

Patented May 31, 1921.
2 SHEETS—SHEET 2.

Inventor
Stuart A. Cogsdill

By Whittemore, Hulbert, and Whittemore
Attorneys

UNITED STATES PATENT OFFICE.

STUART A. COGSDILL, OF DETROIT, MICHIGAN.

METHOD OF FORMING CUTTING-TOOLS.

1,379,853.   Specification of Letters Patent.   Patented May 31, 1921.

Application filed February 20, 1919. Serial No. 278,271.

*To all whom it may concern:*

Be it known that I, STUART A. COGSDILL, a citizen of the United States of America, residing at Detroit, in the county of Wayne and State of Michigan, have invented certain new and useful Improvements in Methods of Forming Cutting-Tools, of which the following is a specification, reference being had therein to the accompanying drawings.

This invention relates to a process for grinding cutting tools and refers more particularly to an improved method for forming a combined drill and countersink, although the novel process in its broader aspects is not necessarily limited to the particular tools mentioned.

The main object of the invention is to provide a more accurate and satisfactory combined drill and countersink, whereby the necessary radial relief can be automatically given to the tool when it is ground.

Another object of the invention is to provide a grinding process which can be used either in originally forming the tools or regrinding broken or injured tools.

The invention also resides in giving a greater radial relief to the countersink than to the drill portion of the tool, and in such further features of the tool and process as will more fully hereinafter appear.

In the drawings:

Figure 1 is a side elevational view, partly in section, of a machine which may be used to carry out the novel process;

Fig. 2 is a top plan view, partly in section, of the construction shown in Fig. 1;

Figure 3:
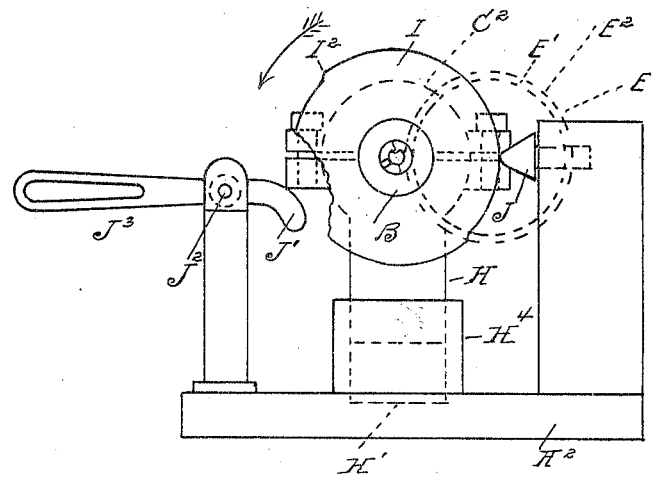
Fig. 3 is an end view of the same.
Figure 4:
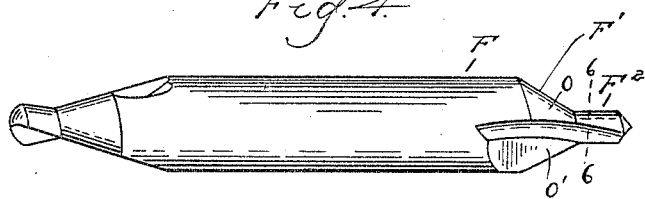
Fig. 4 is an enlarged elevational view of one of the tools.

Describing in detail the apparatus shown in the drawings, A designates a tool holder having a chuck B carried by the revoluble shaft C. The latter is mounted in bearings C' and $C^2$ and is driven by a suitable belt D extending over the pulley D'. E designates a grinding wheel which is located in a position to engage the tool F when the latter is positioned within the chuck. While the form of the grinding wheel E will, of course, vary with the particular tool to be operated on, it is shown as having a beveled portion E' for grinding the countersink part F' of the tool and a straight grinding circumference $E^2$ for grinding the drill portion $F^2$ of the tool.

Figure 6:
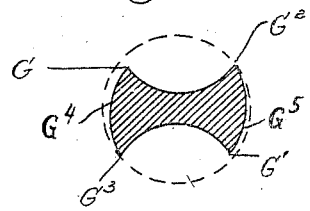
Fig. 6 is an enlarged cross-section view of the tool, the section being taken on line 6—6 of Fig. 4.
Figure 5:
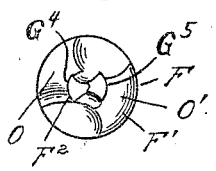
Fig. 5 is an end view of the tool shown in Fig. 4.

In certain classes of work it is essential that the cutting portions of the tool be provided with a radial relief, that is, so formed that the distance between the rear edges G and G' (see Fig. 6) is less than that between the cutting edges $G^2$ and $G^3$. In other words, the last-mentioned edges are formed on a part of greater diameter than the rear edges. In this way any tendency to bind the drill point is avoided, and it is among the chief purposes of this invention to provide a process for automatically forming the radial relief portions when the drill is ground. For this purpose the work-holding chuck B is arranged to be given a periodic lateral motion at certain predetermined portions of rotation of the work.

As shown in Figs. 1 and 3 the bearings C' and $C^2$ are carried by a frame H which, at its lower end, loosely fits in a seat H' of the bed plate $H^2$. This frame H is pivoted between the uprights $H^3$ and $H^4$ by pivots $I^3$ and $I^4$, the latter allowing a slight rocking movement.

Secured to the shaft C is a ring or plate I which has the two halves of its circumferential face slightly eccentric so that a gradual cam effect is secured, beveled shoulders $I^2$ being formed at the intersections of the cam faces. At one side of the rotatable ring or plate I there is located a spring pressed stop J against which the member I is pressed whenever the cam J' is rocked about its pivot $J^2$ by the operator pressing down on the handle of the lever $J^3$. Thus the upward movement of the cam J' will rock the frame H about its pivots $I^3$ and $I^4$ and force the ring I against the stop J.

The arrangement of parts as above described is such that as the work holder B rotates through each revolution it will, by the engagement of the cam shoulders $I^2$ with the stop J, be given a slight positive movement toward the left (see Fig. 3) twice during each revolution. This will shift the drill or other tool which is being ground slightly away from the grinding wheel just prior to engagement of said wheel with either cutting edge $G^2$ or $G^3$ and while the line of contact of the stone with the tool moves rearwardly from a cutting edge of the latter, the depth of the cut is progressively increased. Thus, as shown in Fig. 3, the relation of the stop J to the engaged cam face is such as to effect substantially a maximum depth of cut, such as is desired at the points G and G' of the tool. In this manner the portions of the tool at the rear of the cutting edges are ground off deeper so as to provide the necessary radial relief.

Where combined drills and countersinks are being formed, it is often desirable that the countersink portion, because of its greater diameter, be given a greater radial relief than the drill. This is accomplished in the same machine and by the same mechanism in the following manner:

In addition to the cam for rocking the frame H to the side, there are also employed adjustable pins M and M' which twice during each revolution engage with the stationary cams L and L'. The pins M and M' are carried by the ring I or other suitable mechanism which rotates with the shaft C. The latter is normally longitudinally urged toward the left of the frame by means of the spring N, the arrangement of parts being such that while the substantially cylindrical faces $G^4$ and $G^5$ of the drill and the corresponding beveled faces O and O' of the countersink are being formed, the frame H will be progressively rocked toward the right of Fig. 3 and the shaft C and work holder B also progressively shifted by the cam L or L' to the position shown in Fig. 2. As the pins M or M' disengage from the high points of the cams L or L', the spring N is permitted to retract the tool F slightly from the grind-stone. The movement of the tool to the right effected by the cams M and M' brings the countersink portion of the tool into closer grinding engagement with the beveled surface E' and will thus grind the portions at the rear of the cutting edges of the countersink to a greater depth than the forward or cutting edges.

While I have shown and described use of the process in connection with the formation of a new tool, it is obvious that broken or worn tools can be reground by the same mechanism. Also the invention is not necessarily limited to the formation of the particular kind of tool shown, and various changes can be made in the details of the apparatus for carrying out the process.

What I claim as my invention is:

1. A process of forming combined drills and counter sinks having adjacent cylindrical and beveled portions, consisting in rotating such a tool, grinding the cylindrical and beveled surfaces of the tool simultaneously, and effecting a radial relief of both of said surfaces while being ground.

2. A process of forming combined drills and counter sinks having adjacent cylindrical and beveled portions consisting in rotating such a tool, engaging the cylindrical and beveled portions of the tool during rotation thereof with a rotative abrasive member, relatively shifting the tool and abrasive member to and from each other during each revolution of the tool to effect radial relief of the cylindrical face of the tool, and relatively shifting said tool and cutting member longitudinally of the tool during each revolution thereof to effect radial relief of the beveled surface of the tool.

3. A process of forming combined drills and counter sinks, having adjacent cylindrical and bevel surfaces, consisting in rotating such a tool, grinding the cylindrical and beveled surfaces of the tool simultaneously, and shifting the tool laterally and longitudinally during each revolution thereof to effect radial relief.

4. A process of forming combined drills and counter sinks having adjacent cylindrical and beveled surfaces consisting in rotating such a tool, engaging the cylindrical and beveled surfaces of the tool during rotation thereof with a rotative abrasive member, shifting the tool to and from the axis of the abrasive member during each revolution of the tool, and independently shifting the tool longitudinally during each revolution of the same.

In testimony whereof I affix my signature.

STUART A. COGSDILL.